US009227273B2

(12) United States Patent
Iseki

(10) Patent No.: US 9,227,273 B2
(45) Date of Patent: *Jan. 5, 2016

(54) PB-FREE SOLDER PASTE

(75) Inventor: Takashi Iseki, Ome (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/003,335

(22) PCT Filed: Nov. 18, 2011

(86) PCT No.: PCT/JP2011/076710
§ 371 (c)(1),
(2), (4) Date: Oct. 30, 2013

(87) PCT Pub. No.: WO2012/120733
PCT Pub. Date: Sep. 13, 2012

(65) Prior Publication Data
US 2014/0041760 A1 Feb. 13, 2014

(30) Foreign Application Priority Data
Mar. 8, 2011 (JP) .................. 2011-050098

(51) Int. Cl.
B23K 35/02 (2006.01)
B23K 35/26 (2006.01)
C22C 12/00 (2006.01)

(52) U.S. Cl.
CPC ............. *B23K 35/025* (2013.01); *B23K 35/264* (2013.01); *C22C 12/00* (2013.01)

(58) Field of Classification Search
CPC .. B23K 35/264; B23K 35/025; H05K 3/3463; C22C 12/00
USPC ....................................... 428/576
See application file for complete search history.

(56) References Cited

U.S. PATENT DOCUMENTS

| 2002/0012608 A1 | 1/2002 | Takaoka et al. |
| 2002/0040624 A1 | 4/2002 | Nakamura et al. |
| 2009/0242249 A1 | 10/2009 | Furusawa et al. |
| 2009/0308496 A1* | 12/2009 | Kawamata et al. ............. 148/24 |
| 2010/0035072 A1 | 2/2010 | Watanabe et al. |

FOREIGN PATENT DOCUMENTS

| CN | 1622354 A | 6/2005 |
| JP | H8-215880 | 8/1996 |
| JP | H11-77366 | 3/1999 |
| JP | 2002-160089 A1 | 6/2002 |
| JP | 2004-25232 A1 | 1/2004 |
| JP | 2004-528992 A1 | 9/2004 |
| JP | 2004-533327 A1 | 11/2004 |
| JP | 2005-161318 A | 6/2005 |
| JP | 2005161318 A * | 6/2005 |
| JP | 3671815 B2 | 7/2005 |
| JP | 2005-297011 A1 | 10/2005 |
| JP | 2006-167790 A1 | 6/2006 |
| JP | 2007-181880 A1 | 7/2007 |
| JP | 2007-281412 A1 | 10/2007 |
| JP | 2007-313526 A1 | 12/2007 |
| JP | 2008-284583 A1 | 11/2008 |
| JP | 4807465 B1 | 11/2011 |
| WO | WO 2007/018288 A1 | 2/2007 |

OTHER PUBLICATIONS

Notice of Reasons for Rejection for Japanese Patent Application No. 2011-050098 dated Feb. 12, 2012 with English translation.
Notice of Allowance for Japanese Patent Application No. 2011-050098 dated Aug. 21, 2012 with English translation.
Notification of Reason for Rejection for Japanese Patent Application No. 2011-050098 dated Feb. 14, 2012.
International Search Report for International Application No. PCT/JP2011/076710 dated Feb. 21, 2012.
First Office Action dated Oct. 29, 2014, German Application No. 112011105017.8.
First Office Action issued Jun. 4, 2014 by the State Intellectual Property Office of the P.R. China in counterpart application No. 201180070762.3 with English translation.

* cited by examiner

Primary Examiner — Weiping Zhu
(74) Attorney, Agent, or Firm — Kratz, Quintos & Hanson, LLP

(57) ABSTRACT

There is provided a high-temperature Pb-free solder paste having the strength required to join electronic parts to a substrate and having excellence in wettability and workability. The solder paste formed by mixing a solder alloy and a flux, the solder alloy consisting of, based on the total mass of the solder alloy as 100 mass %: 0.4 to 13.5 mass % of Zn, at least one of 0.01 to 2.0 mass % of Cu or 0.03 to 0.7 mass % of Al, and a balance being Bi except for inevitable impurities.

2 Claims, 1 Drawing Sheet

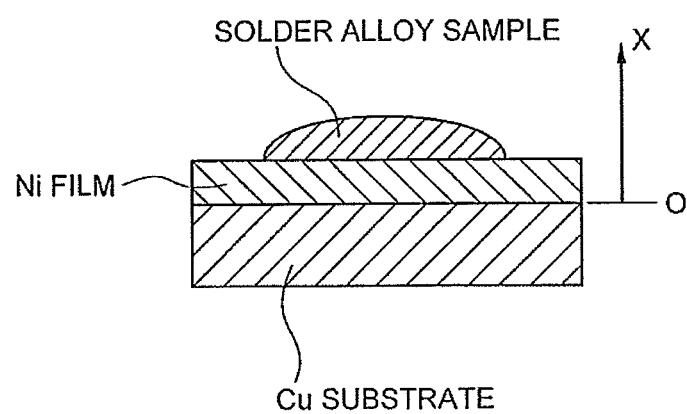

PB-FREE SOLDER PASTE

TECHNICAL FIELD

The present invention relates to a Pb-free solder paste containing no lead (Pb). More particularly, the present invention relates to a Pb-free solder paste for high-temperature applications.

BACKGROUND ART

In recent years, restrictions on chemical substances harmful to the environment have become increasingly stringent, and the restrictions on solder materials used to join electronic parts or the like to a substrate are no exceptions. Pb has been used as a major component of solder materials since old times, but has already been designated as a restricted substance by, for example, RoHS Directive. Therefore, solders containing no Pb (Pb-free solders) have been actively developed.

Solders used to join electronic parts to a substrate are broadly divided into high-temperature solders (about 260 to 400° C.) and low- and medium-temperature solders (about 140 to 230° C.) based on their service temperature limits. As for low- and medium-temperature solders, Pb-free solders mainly containing Sn have already been practically used. For example, Patent Document 1 discloses a Pb-free solder alloy composition containing Sn as a major component, 1.0 to 4.0 mass % of Ag, 2.0 mass % or less of Cu, 0.5 mass % or less of Ni, and 0.2 mass % or less of P. Further, Patent Document 2 discloses a Pb-free solder alloy composition containing 0.5 to 3.5 mass % of Ag, 0.5 to 2.0 mass % of Cu, and the balance being Sn.

On the other hand, Pb-free solder materials for high-temperature applications are under development in various organizations. For example, Patent Document 3 discloses a Bi/Ag brazing filler material containing 30 to 80 mass % of Bi and having a melting temperature of 350 to 500° C. Further, Patent Document 4 discloses a solder alloy obtained by adding a binary eutectic alloy to an eutectic alloy containing Bi and by further adding an additive element thereto, and describes that this solder alloy is a quaternary or higher solder, that is, a multi-component solder, but it is possible to adjust its liquidus-line temperature and to reduce variations in composition.

Patent Document 5 discloses a solder alloy obtained by adding Cu—Al—Mn, Cu, or Ni to Bi, and describes that when such a solder alloy is used to join a power semiconductor device having a Cu surface layer to an insulator substrate having a Cu surface layer, an undesired reaction product is less likely to be formed at a joint interface between the solder and each of the Cu layers so that the occurrence of defects such as cracks can be suppressed.

Patent Document 6 discloses a solder composition containing, based on the total mass of the solder composition, 94.5 mass % or more of Bi as a first metal element, 2.5 mass % of Ag as a second metal element, and a total of 0.1 to 3.0 mass % of at least one selected from the group consisting of 0.1 to 0.5 mass % of Sn, 0.1 to 0.3 mass % of Cu, 0.1 to 0.5 mass % of In, 0.1 to 3.0 mass % of Sb, and 0.1 to 3.0 mass % of Zn as a third metal element.

Patent Document 7 discloses a Pb-free solder composition containing a Bi-based alloy containing at least one of Ag, Cu, Zn, and Sb as an accessory component and 0.3 to 0.5 mass % of Ni. Patent Document 7 further describes that this Pb-free solder has a solidus-line temperature of 250° C. or higher and a liquidus-line temperature of 300° C. or less. Further, Patent Document 8 discloses a binary alloy containing Bi, and describes that this binary alloy has the effect of suppressing the occurrence of cracks in the inside of a soldering structure.

Patent Document 9 discloses a Bi alloy having a melting temperature of 270° C. or higher and containing 0.2 to 0.8 mass % of Cu and 0.2 to 0.02 mass % of Ge. Patent Document 10 discloses a Bi alloy having a solidus-line temperature of at least 262.5° C. and containing 2 to 18 mass % of Ag and 82 to 98 mass % of Bi. Patent Document 11 discloses a Bi alloy having a solidus-line temperature of 260° C. or higher and containing at least 80 mass % of Bi.

Patent Document 12 discloses a Bi—Sn-based solder paste and an article joined by means of the solder paste, in which the solder paste contains 30 mass % or more of Bi in the form of metal alloy powder. The solder paste provides higher joint strength after joining and produces no void even though an object to be joined includes Au. Patent Document 12, for example, discloses a solder paste containing 30 to 98 weight % of Bi, 0.01 to 0.5 weight % of either Al or Mn, and the balance being Sn.

Patent Document 13 discloses a solder paste including a solder powder having bismuth or an alloy mainly containing bismuth and having a solidus-line temperature of 250° C. or higher and a liquidus-line temperature of 370° C. or less, a thermoplastic resin to be melted at a temperature higher than the solidus-line temperature of the solder powder and having a function to support the strength of the solder by remaining after soldering, and a flux.

PRIOR ART DOCUMENTS

Patent Documents

Patent Document 1: Japanese Patent Application Kokai No. 11-077366
Patent Document 2: Japanese Patent Application Kokai No. 8-215880
Patent Document 3: Japanese Patent Application Kokai No. 2002-160089
Patent Document 4: Japanese Patent Application Kokai No. 2006-167790
Patent Document 5: Japanese Patent Application Kokai No. 2007-281412
Patent Document 6: Japanese Patent No. 3671815
Patent Document 7: Japanese Patent Application Kokai No. 2004-025232
Patent Document 8: Japanese Patent Application Kokai No. 2007-181880
Patent Document 9: Japanese Patent Application Kokai No. 2007-313526
Patent Document 10: Japanese patent Application Kohyo No. 2004-533327
Patent Document 11: Japanese patent Application Kohyo No. 2004-528992
Patent Document 12: Japanese patent Application Kohyo No. 2008-284583
Patent Document 13: Japanese patent Application Kohyo No. 2005-297011

DISCLOSURE OF THE INVENTION

Problems to be Solved by the Invention

As described above, high-temperature Pb-free solder materials have been developed by various organizations, but in fact, solder materials having properties fully satisfactory for practical use have not yet been found.

In general, materials having relatively low upper temperature limits, such as thermoplastic resins and thermosetting resins, are often used for electronic parts and substrates, and therefore a working temperature needs to be less than 400° C., preferably 370° C. or less. However, in the case of, for example, the Bi/Ag brazing filler material disclosed in Patent Document 3, its liquidus-line temperature is as high as 400 to 700° C., and therefore it is estimated that a working temperature during joining is 400 to 700° C. or higher. In this case, the working temperature exceeds the upper temperature limits of electronic parts or substrates to be joined.

High-temperature solders are generally required to have properties such as high solidus-line temperature, moderate liquidus-line temperature, high durability against repeated heating/cooling cycles, good thermal stress relaxation properties, and good wetting and spreading properties. The solder alloys mainly containing Bi need to solve problems specific to Bi-based solders in addition to having the above mentioned properties.

More specifically, Bi-based solders have a problem in that they have brittle mechanical properties. In addition, when an electronic part has a Ni surface layer to enhance its joinability with a solder, there is a case where the Ni layer rapidly reacts with Bi contained in the solder to form a brittle alloy of Ni and Bi, and diffusion of Ni into Bi occurs due to breakage or separation of the Ni layer so that joint strength is significantly reduced. There is a case where a Ag or Au layer is provided on the Ni layer, but in this case, the Ag or Au layer is provided for the purpose of preventing oxidation of the Ni layer or improving wettability, and therefore the Ag or Au immediately diffuses into the solder alloy and hardly has the effect of suppressing the Ni diffusion.

As described above, Bi-based solders have the problem of Ni diffusion, but Patent Document 4 does not provide any measure to solve this problem nor provide any improvement against the brittle mechanical properties of the Bi-based solders. Similarly, none of Patent Documents 6 to 11 disclose any measure to prevent Ni from diffusing into Bi.

In Patent Document 5, there is a description about comparative examples in which a surface layer to be joined with a solder is not formed of a Cu layer but formed of a Ni layer. More specifically, Patent Document 5 describes that the solder obtained by adding Cu—Al—Mn, Cu, or Ni to Bi produces a large amount of $Bi_3Ni$ at a joint interface and many voids are observed around it. Patent Document 5 also describes that it has been confirmed that the $Bi_3Ni$ is very brittle and it is difficult to achieve high reliability under severe conditions where heat cycles are repeated.

As described above, Patent Document 12 discloses the solder paste containing 30 to 98 weight % of Bi, 0.01 to 0.5 weight % of either Al or Mn, and the balance being Sn. However, it is unlikely that the alloy with these wide ranges of Bi and Sn contents satisfies even least requirements of liquidus-line temperature, solidus-line temperature, wettability, and stress relaxation property over the entire ranges of the contents. For example, the present inventor has confirmed that, when electronic parts or the like is joined by using a solder consisting of 95% of Bi and the balance being the above-mentioned elements, the solder becomes extremely brittle and susceptive to cracking. According to the present inventor's experiment, the solder displayed a crack within 200 heat cycles of −50° C. cooling and 125° C. heating. The present inventor has found out that the cracking is caused by a reaction between Sn and a Ni layer of the electronic part, which proceeds during the heat cycle test. The present inventor has also found that this reaction causes withdrawal of Sn from the brittle solder, and therefore the solder approaches pure brittle metal of Bi.

Patent Document 13 discloses the solder paste including the solder powder having bismuth or an alloy mainly containing bismuth and having a solidus-line temperature of 250° C. or higher and a liquidus-line temperature of 370° C. or less. However, since Cu, Ag, and Sb disclosed in Patent Document 13 have no effect to suppress the Ni diffusion, the material of Patent Document 13 is considered poor in practicality. Further, Patent Document 13 describes that the range of Zn content is about 0.01 to 0.1 weight % to have a solidus-line temperature of 250° C. or higher and a liquidus-line temperature of 370° C. or less. However, the present inventor has confirmed that an alloy having 0.2 weight % or less of Zn is not enough to have an effect to suppress the Ni diffusion and therefore the alloy with this Zn content cannot obtain sufficient reliability.

In addition, a Bi-based solder is likely to have problems of wettability and workability. Specifically, solid solution of Bi into Cu hardly occurs, and therefore the Bi-based solder cannot join to a Cu surface and the like, so that the Bi-based solder exhibits extremely poor wettability. Further, Bi is very brittle as described above and its coefficient of extension is 1% or less, and therefore Bi in itself is hard to be formed into a wire shape or the like. For example, when manufacturing a thin wire having an outer diameter of approximately 0.2 mm, material to be used needs to have an excellent workability. However, none of Patent Documents 3 to 11 describe in detail about measures to overcome these wettability and workability problems.

As described above, in the case of Pb-free solders mainly containing Bi, it is necessary to consider prevention of the diffusion of material of a Ni layer provided in electronic parts into a Bi-based solder as well as to improve mechanical properties. Further, it is necessary to greatly improve the wettability. If these problems are not solved, the Pb-free solders mainly containing Bi cannot have the strength required to join electronic parts to a substrate and therefore cannot be practically used.

It is therefore an object of the present invention to provide a solder paste which includes a Bi-based solder alloy virtually having a solidus temperature of 260° C. or higher and thus permitting high-temperature applications, and which can overcome problems specific to Bi-based solders, that is, a brittle mechanical property, wettability and Ni diffusion into Bi.

Means for Solving the Problems

In order to achieve the above object, the present invention provides a solder paste formed by mixing a solder alloy and a flux, the solder alloy consisting of, based on the total mass of the solder alloy as 100 mass %: 0.4 to 13.5 mass % of Zn, at least one of 0.01 to 2.0 mass % of Cu or 0.03 to 0.7 mass % of Al, and a balance being Bi except for inevitable impurities.

The above-described solder paste of the present invention may use a flux including rosin. Further, in the above-described solder paste of the present invention, it is preferable that Al is not included in the solder alloy except for an inevitable case if the solder alloy includes more than 13.1 mass % of Zn or more than 1.9 mass % of Cu.

Effects of the Invention

According to the present invention, it is possible to provide a high-temperature Pb-free solder paste having the strength required to joint electronic parts to a substrate and having excellence in wettability and workability. Further, it is possible to provide a Bi-based solder paste which virtually has resistance to a reflow temperature of 260° C. or more and which has capabilities of suppressing the reaction between Bi contained in a solder alloy and a Ni layer provided in electronic parts or the like and suppressing the Ni diffusion into Bi-based solder. The use of the Bi-based solder paste of the present invention makes it possible to significantly enhance the reliability of Pb-free soldering at high temperature.

BRIEF DESCRIPTION OF THE DRAWING

FIG. 1 is a schematic view of a Cu substrate with a Ni film, where a solder alloy sample for an EPMA line analysis is joined thereto.

MODE FOR CARRYING OUT THE INVENTION

High-temperature Pb-free solder alloys generally need to withstand a reflow temperature of about 260° C. Further, when they are Bi-based solders, it is necessary to suppress the reaction between Bi and Ni and to suppress the diffusion of Ni into Bi. If these suppressions are inadequate, there is a possibility that Ni layers generally provided in electronic parts or the like react with Bi contained in a solder so that a brittle Bi—Ni alloy is formed and joints become brittle due to the diffusion of Ni into Bi. As a result, joint strength is reduced, which reduces the reliability of a device having an electronic circuit board using the solder alloy for joining.

The present inventor has studied the reactivity between Ni and other various elements, and has found that Zn is more preferential than Bi to react with a Ni layer and to form an alloy. The present inventor has also found that, in the case of a binary alloy obtained by adding only Zn to Bi, workability can be ensured to some extent, but wettability becomes poor due to the strong reducing properties of Zn, which reduces joinability.

Based on these finding, the present inventor has continued his studies diligently regarding measures to improve workability, wettability and reliability as well as to suppress the Ni diffusion. As a result, the present inventor has found that it is effective to add various elements to a base material formed of the Bi—Zn alloy. Specifically, it has been confirmed that addition of at least one of Cu or Al is very effective to improve solder reliability, that is, strength and durability against repeated heat cycles and so on.

It has further confirmed that addition of Cu or Al improves the wettability. However, there may be a specific joining situation where much more improved wettability is required. For example, in a situation where an oxygen concentration during joining of electronic parts or the like is as high as 1000 ppm or higher, or a situation where a joining temperature is more than 380° C. In these situations, the electronic parts and a surface of the solder easily oxidize, which results in a decrease of wettability and causes significant decrease in joinability.

In order to ensure high wettability under these situations, it is preferable to control the formation of an oxide film or the like on a solder surface. As a measure to achieve this, it has been confirmed that a solder having a paste form is effective. This is because a flux included in the paste form makes it possible to reduce and remove the oxide film, and prevent progress of further oxidation. Moreover, a solder alloy may have a powder shape. Accordingly, it is not necessary for a brittle alloy to be formed into a hard-to-form shape such as a wire shape or a sheet shape.

A description will be made hereinbelow regarding an element to be contained, an element to be contained as necessary, and a flux to be contained in the Pb-free solder paste according to the present invention having the above-described characteristic effects.

<Bi>

Bi is a main component of the high-temperature Pb-free solder alloy according to the present invention. Bi belongs to Va Group elements (N, P, As, Sb, Bi) and is a very brittle metal having a trigonal (rhombohedral) crystal structure with low symmetry. By performing a tensile test or the like on Bi, its brittle fracture surface is easily observed. That is, pure Bi is a metal poor in ductility. According to the present inventor's experiment, extension percentage of a wire formed of a simple Bi substance was 1% or less.

In order to overcome such brittleness of Bi, various elements which will be described below are added, and then they are mixed with a flux to have a paste form. The type and amount of elements to be added depend on which of the various properties of Bi (e.g., brittleness) is improved and how much improvement is desired. Therefore, the Bi content of the solder alloy inevitably varies depending on the type and amount of element to be added. It is to be noted that the reason why Bi is selected from among elements belonging to Va Group is that elements belonging to Va Group other than Bi are classified as semimetals or nonmetals and are more brittle than Bi. Further, Bi has a melting point of 271° C. which is higher than a reflow temperature of about 260° C. at which high-temperature solders are used.

<Zn>

Zn is an essential element to be added to the high-temperature Pb-free solder alloy according to the present invention. Addition of Zn to Bi makes it possible to overcome brittleness and improve workability due to the solid solution of Zn in Bi. In a case where Zn is added in an amount larger than that at the eutectic point between Zn and Bi, a larger amount of Zn-rich phase appears so that workability is further improved.

Further, addition of Zn makes it possible to obtain important effects, that is, suppression of the reaction between Bi and Ni and suppression of the diffusion of Ni into a Bi-based solder. The reason why such effects can be obtained is because Zn has higher reactivity with Ni than Bi and therefore a thin Zn—Ni layer is formed on the surface of a Ni layer and this Zn—Ni layer acts as a barrier to suppress the reaction between Ni and Bi. This prevents the formation of a brittle Bi—Ni alloy and prevents the diffusion of Ni into Bi, thereby achieving high joinability.

The optimum amount of Zn contained in the solder alloy to provide such excellent effects is generally 0.4 to 13.5 mass %, which depends on, for example, the thickness of a Ni layer, reflow temperature, and reflow time. If the Zn content is less than 0.4 mass %, the effect of suppressing the Ni diffusion is inadequate or Zn is consumed to suppress Ni diffusion and therefore good workability cannot be obtained. On the other hand, if the Zn content exceeds 13.5 mass %, the liquidus-line temperature of the solder alloy exceeds 400° C., which makes it impossible to achieve successful joining.

Addition of an appropriate amount of Al (which will be described later) to the solder alloy containing Zn in an amount within the above range makes it possible to further improve the workability of the Zn-rich phase, thereby further enhancing the effect obtained by adding Zn.

<Cu>

Cu is an element to be added under the condition that at least one of Cu or Al must be added to the high-temperature Pb-free solder alloy according to the present invention. By adding Cu, an intermetallic compound of Zn and Cu is formed. The Zn—Cu intermetallic compound is finely dispersed in Bi to finely crystallize the master alloy, and also plays a role as a filler to improve strength and workability. That is, addition of Cu is expected to have the effect of improving brittleness of Bi due to structural refinement and the effect of the Zn—Cu intermetallic compound as a filler. An improvement in the brittleness of the solder of course leads to an improvement in joint strength and to a significant improvement in durability against repeated heat cycles. This significantly improves the joint reliability of the solder.

In a case where the surface of a base material to which the solder is to be joined is made of Cu, addition of Cu to the solder makes it possible to achieve good wettability because the solder and the surface contain the same metal. Even when the surface of a base material to which the solder containing Cu is to be joined is made of Ni, good wettability can be obtained as in the above case. In this case, however, it is considered that the reason for this is that the solder matrix becomes less likely to be oxidized because Cu is less likely to be oxidized.

The amount of Cu contained in the solder alloy is determined in consideration of characteristics such as workability and wettability as well as the amount of solid solution of Cu in, for example, Bi. More specifically, the Cu content is 0.01 to 2.0 mass %, and is preferably 0.05 mass % or more but less than 1.0 mass % from the viewpoint of further enhancing the above-described effects. If the Cu content exceeds 2.0 mass %, segregation of Cu having a high melting point occurs, thereby causing a problem such as reduction in joinability.

On the other hand, it has been confirmed that if the Cu content is less than 0.01 mass % (lower limit), virtually no desired effect of improving workability or wettability is obtained. It is to be noted that the Cu content is not very large with respect to the total mass of the solder alloy as long as it is in the range of 0.01 to 2.0 mass %, and therefore other properties required for the solder are not adversely affected.

<Al>

Al is an element to be added under the condition, as mentioned above, that at least one of Cu or Al must be added. Al is preferably added when workability or wettability needs to be further improved. The reason why wettability is improved by adding Al is because Al itself is oxidized due to its strong reducing properties and therefore oxidation of the solder matrix can be suppressed by adding only a small amount of Al. On the other hand, the reason why workability is improved by adding Al can be described based on the following two mechanisms.

The first mechanism is the same as that described above with reference to a case where Cu is added. More specifically, an intermetallic compound of Zn and Al is formed by adding Al, and the Zn—Al intermetallic compound is finely dispersed in Bi to finely crystallize the master alloy and also plays a role as a filler. This improves the strength and workability of the solder alloy. That is, brittleness of Bi is improved by structural refinement and the effect of the intermetallic compound as a filler.

The second mechanism is as follows. Zn and Al form an alloy, and particularly, refinement of the alloy having about a Zn—Al eutectic composition improves workability. As described above, workability-improving effect obtained by adding Al is based on the two different mechanisms. When Al is added, the preferable Al content of the solder alloy is 0.03 to 0.7 mass %. If the Al content is less than 0.03 mass %, it is too small and addition of Al has no meaning. On the other hand, if the Al content exceeds 0.7 mass %, the melting point of the solder alloy becomes too high or segregation of Al occurs. Further, the composition of the Zn—Al alloy deviates from its eutectic composition, which makes it impossible for Al to exhibit its workability-improving effect.

It is preferred that Al is not added when the solder contains one or both of the above-described Zn and Cu in an amount(s) near its or their allowable upper limit(s). For example, when an alloy contains more than 13.1 mass % of Zn or contains more than 1.9 mass % of Cu, it is preferable that the alloy contains no Al except for an inevitable case. This is because when the solder contains Zn or Cu in an amount near its upper limit, the solder already has a very high liquidus temperature, and therefore if Al having a high melting point is further added, the liquidus temperature becomes too high and successful joining cannot be achieved.

<Flux>

There is no limitation on type of a flux to be used for a solder paste of the present invention. For example, resin system, inorganic chloride system, organohalide system and so on may be used for the flux. Hereinbelow, the most common flux type will be described, where a rosin is used as a base material and an activator and a solvent are added thereto.

It is preferable that the flux consists of, based on the total mass of the flux as 100 mass %, 20 to 30 mass % of rosin as a base material, 0.2 to 1 mass % of activator, and 70 to 80 mass % of solvent. With this composition, a solder paste having good wettability and joinability can be obtained. The rosin as the base material may be either natural unmodified rosin such as wood resin rosin, gum rosin, and tall oil rosin, or altered rosin such as rosin ester, hydrogenated rosin, rosin-modified resin, and polymerized rosin.

As for the solvent, acetone, amylbenzene, n-amine alcohol, benzene, carbon tetrachloride, methyl alcohol, ethyl alcohol, isopropyl alcohol, methyl ethyl ketone, toluene, oil of turpentine, xylene, ethylene glycol monophenyl ether, ethylene glycol monobutyl ether, and so on can be used.

As for the activator, aniline hydrochloride, hydrazine hydrochloride, cetylpyridine bromide, phenylhydrazine hydrochloride, tetrachloronaphthalene, methylhydrazine hydrochloride, methylamine hydrochloride, ethylamine hydrochloride, diethylamine hydrochloride, butylamine hydrochloride, diphenylguanidine HBr, and so on can be used.

Preferable flux can be obtained by selecting from among materials that fulfill an objective of the flux such as these solvents and activators described above, and by appropriately adjusting amounts of these materials. For example, when an oxide film on a joining surface of a solder alloy or a substrate and so on is hard, it is preferable to increase the amount of rosin or activator to be added and to adjust viscosity or fluidity by means of solvent.

The solder paste obtained by mixing the above-described solder alloy and flux has extremely good wettability because of an effect of the flux. Further, it is not necessary for the solder alloy to be formed into a hard-to-form shape such as a sheet shape. The solder alloy may have a powder shape that is an easy-to-form shape. With the above-described alloy composition, a reaction between Ni and Bi can be suppressed.

The use of the high-temperature Pb-free solder paste according to the present invention to joint electronic parts to a substrate makes it possible to provide electronic circuit boards having high durability and reliability even when used under severe conditions, e.g., in an environment where heat cycles are repeated. By incorporating such electronic circuit boards into devices to be used under severe conditions such as power semiconductor devices (e.g., thyristors, inverters), various control units for automobiles and the like, and solar cells, the reliability of these devices can be further improved.

EXAMPLES

First, as raw materials, Bi, Zn, Cu, and Al each having a purity of 99.99 mass % or higher were prepared. Large flaky or bulky raw materials were cut or ground into small pieces of 3 mm or less so that the composition of a molten alloy was made uniform without variations according to sampling site. Then, predetermined amounts of these raw materials were weighed and placed in a graphite crucible for high-frequency melting furnace.

The crucible containing the raw materials was placed in a high-frequency melting furnace, and nitrogen was allowed to flow at a flow rate of 0.7 L/min or more per kilogram of the raw materials to suppress oxidation. In this state, the melting furnace was turned on to melt the raw materials by heating. When the metals started to melt, they were well mixed under stirring with a mixing stick so that the composition of a molten metal was made uniform without local variations. After it was confirmed that the metals were fully melted, the high-frequency melting furnace was turned off, and the crucible was immediately taken out of the melting furnace and the molten metal in the crucible was poured into a mold for a solder master alloy. As the mold, one having the same form as that generally used for producing a solder alloy was used.

Solder master alloys different in the mixing ratio among these raw materials were prepared in such a manner as described above as samples 1 to 15. The compositions of these solder master alloy samples 1 to 15 were analyzed by an ICP emission spectrometer (SHIMAZU S-8100). The results of analysis are shown in the following Table 1.

TABLE 1

| Samples | Solder Composition (% by mass) | | | |
| --- | --- | --- | --- | --- |
| | Bi | Zn | Cu | Al |
| 1 | Balance | 0.5 | 0.8 | — |
| 2 | Balance | 6.4 | 0.7 | — |
| 3 | Balance | 13.1 | 0.8 | — |
| 4 | Balance | 3.1 | 0.05 | — |
| 5 | Balance | 3.0 | 1.0 | — |
| 6 | Balance | 3.0 | 1.9 | — |
| 7 | Balance | 2.9 | — | 0.06 |
| 8 | Balance | 3.0 | — | 0.6 |
| 9 | Balance | 3.1 | 0.7 | 0.3 |
| 10 | Balance | 3.0 | 0.8 | 0.4 |
| *11 | Balance | 0.05 | 0.8 | — |
| *12 | Balance | 18.1 | 0.7 | — |
| *13 | Balance | 13.1 | 4.4 | — |
| *14 | Balance | 13.0 | — | 3.1 |
| *15 | Balance | 13.0 | 2.5 | 0.9 |

Note:
Samples marked with * are Comparative Examples.

(Manufacturing of Solder Alloy Powder)

Solder alloy powders for paste are generally manufactured by means of atomization although not particularly limited thereto. The atomization may be performed either in a gas phase or a liquid phase, which may be selected in consideration of particle diameter or particle size distribution of the solder powder to be obtained. In this example, the solder alloy powders were manufactured by means of gas phase atomization which has better productivity and can manufacture relatively fine powders.

Specifically, a gas phase atomizer (manufactured by Nisshin Giken Co., Ltd.) was used to perform gas phase atomization of high-frequency melt type. Firstly, each of the above-described solder master alloy samples 1 to 15 was placed in a high-frequency melting crucible. The crucible was sealed with a lid and then nitrogen was introduced therein to substantially achieve an oxygen free condition. Nitrogen was also introduced around a sample outlet and a collection container section to achieve an oxygen free condition.

In this state, the high-frequency power source was turned on to heat the solder master alloy to 350° C. or more. In a fully melt state, the solder master alloy was pressurized with nitrogen and atomized. A fine solder powder manufactured in this manner was collected in a container. The powder was sufficiently cooled in the container and then transferred to the atmosphere. The reason why the powder was transferred after sufficient cooling was that the powder in a high temperature state ignites when transferred to the atmosphere or the fine solder powder oxidizes thereby decreasing wettability and other effects.

(Manufacturing of Solder Paste)

Thereafter, each of the fine solder powders manufactured from the solder master alloy samples was mixed with a flux to form a solder paste. The flux was made of rosin as a base material, diethylamine hydrochloride $((C_2H_5)_2NH \cdot HCl)$ as an activator, and ethyl alcohol as a solvent. Based on the total mass of the flux as 100 mass %, the amount of rosin was 23 mass %, the amount of diethylamine hydrochloride was 0.3 mass %, and the balance being ethyl alcohol. This flux and the above-described fine solder powder were mixed by using a small blender to obtain a solder paste in the proportion of 9.2 mass % of the flux and 90.8 mass % of the fine solder powder.

In this manner, solder paste samples 1 to 15 were respectively manufactured from the solder master alloys of samples 1 to 15 shown in the above Table 1. These solder paste samples 1 to 15 were then subjected to wettability (joinability) evaluation, EPMA line analysis (for evaluation of Ni diffusion-preventing effect), and heat cycle test which will be described later.

<Wettability (Joinability) Evaluation>

Wettability (joinability) evaluation was performed using the above-described solder paste. First, a wettability tester (device name: atmosphere control-type wettability tester) was activated, a heater unit to be heated was doubly covered, and nitrogen was allowed to flow from four points around the heater unit (flow rate of nitrogen at each point: 12 L/min). Then, the heater was heated. The preset temperature of the heater was 340° C.

After the temperature of the heater became stable at 340° C., a Cu substrate (thickness: about 0.70 mm) having a Ni film (thickness: about 2.5 µm) formed thereon was set in the heater unit and heated for 25 seconds. Then, the solder paste was placed on the Cu substrate and heated for 25 seconds. After a lapse of 25 seconds, the Cu substrate was removed from the heater unit and once transferred to a space adjacent to the heater unit kept under nitrogen atmosphere for cooling.

After being sufficiently cooled, the Cu substrate was transferred into the atmosphere to observe a joint section. Evaluation was performed according to the following criteria.

good: The solder thinly wet-spread and no segregation or the like of metal was observed.

average: Uneven segregation of metal was observed on the solder.

It should be noted that the reason why the wet-spread solder with segregation is evaluated as average is that the segregation permits easier capture of bubbles at the joining section and increases a void occurrence rate. In other words, the segregation creates many non-joining sections at the boundary between the solder and the substrate.

<EPMA Line Analysis (for evaluation of Ni diffusion-preventing effect)>

EPMA line analysis was performed to determine whether or not problems such as reduction in the thickness of a Ni film provided on a Cu substrate due to reaction with Bi and diffusion of Ni into Bi had occurred. It is to be noted that this analysis was performed using a Cu substrate having the solder alloy joined thereto, and the Cu substrate was prepared in the same manner as in the above-described wettability evaluation.

First, a Cu substrate having the solder alloy joined thereto was prepared in the same manner as in the wettability evaluation, embedded in a resin, polished using a polisher by changing polishing paper from coarse one to fine one, and finally buffed. Then, line analysis was performed using EPMA (device name: SHIMADZU EPMA-1600) to examine Ni diffusion, etc.

In measurement, the cross section of the Cu substrate having the solder alloy joined thereto was observed from the side, wherein the joint surface between the Cu substrate and the Ni film was defined as an origin point "O" and a direction from the origin point toward the solder was defined as a plus direction along an X axis (see FIG. 1). Measurement was performed at five random points, and the most average result was evaluated according to the following criteria.

poor: The thickness of the Ni film was reduced by 10% or more due to reaction or Ni was diffused in the solder in the form of a layer.

good: The thickness of the Ni film was hardly changed from its initial value, and Ni was not diffused in the solder.

<Heat Cycle Test>

A heat cycle test was performed to evaluate solder joint reliability. It is to be noted that this test was performed using a Cu substrate having the solder alloy joined thereto, and the Cu substrate was obtained in the same manner as in the above-described wettability evaluation. First, a Cu substrate having the solder alloy joined thereto was subjected to a predetermined number of cooling and heating cycles, where each cycle consists of cooling at −50° C. and heating at 150° C.

Then, the Cu substrate having the solder alloy joined thereto was embedded in a resin, and its cross section was polished to observe a joint surface with a SEM (device name: HITACHI S-4800). Evaluation was performed according to the following criteria.

poor: Peeling was observed at the joint surface or cracks were observed in the solder.

good: Such defects were not observed and the joint surface was maintained in its initial state. The evaluation and test results are shown in Table 2.

TABLE 2

| Samples | Wettability | Ni Diffusion | Heat Cycle Test (times) | |
|---|---|---|---|---|
| | | | 200 | 500 |
| 1 | good | good | good | good |
| 2 | good | good | good | good |
| 3 | good | good | good | good |
| 4 | good | good | good | good |
| 5 | good | good | good | good |
| 6 | good | good | good | good |
| 7 | good | good | good | good |
| 8 | good | good | good | good |
| 9 | good | good | good | good |
| 10 | good | good | good | good |
| *11 | good | poor | poor | — |
| *12 | average | good | poor | — |
| *13 | average | good | poor | — |
| *14 | average | good | poor | — |
| *15 | average | good | poor | — |

Note:
Samples marked with * are Comparative Examples.

As can be seen from the above Table 2, the solder paste samples 1 to 10 satisfying the requirements of the present invention achieved good results in all the evaluation tests. Specifically, in the wettability evaluation, the samples 1 to 10 were thinly and successfully spread without having segregation. In the EPMA line analysis, diffusion of Ni into Bi did not occur. In the heat cycle test, no defects occurred even when 500 heat cycles were performed.

On the other hand, the solder paste samples 11 to 15 as comparative examples not satisfying the requirements of the present invention achieved poor results in at least one of the characteristic. Specifically, the samples 12 to 15 were evaluated as average in wettability because these solders did not spread successfully and segregations occurred. In the case of the sample 11, diffusion of Ni is observed in the EPMA line analysis. In the heat cycle test, defects were observed in all the samples 11 to 15 as comparative examples before 200 heat cycles were performed.

The invention claimed is:

1. A Pb-free solder paste formed by mixing a solder alloy powder and a flux,
   the solder alloy consisting of, based on the total mass of the solder alloy powder as 100 mass %:
   0.4 to 13.1 mass % of Zn,
   and 0.03 to 0.4 mass % of Al, and
   a balance being Bi except for inevitable impurities, and
   the flux consisting of, based on the total mass of the flux as 100 mass %:
   20 to 30 mass % of rosin,
   0.2 to 1 mass % of activator, and
   70 to 80 mass % of solvent.

2. A Pb-free solder paste formed by mixing a solder alloy powder and a flux,
   the solder alloy powder consisting of, based on the total mass of the solder alloy powder as 100 mass %:
   0.4 to 13.1 mass % of Zn,
   0.01 to less than 2.0 mass % of Cu,
   0.03 to 0.4 mass % of Al, and
   a balance being Bi except for inevitable impurities, and
   the flux consisting of, based on the total mass of the flux as 100 mass %:
   20 to 30 mass % of rosin,
   0.2 to 1 mass % of activator, and
   70 to 80 mass % of solvent.

* * * * *